(12) United States Patent
Shen et al.

(10) Patent No.: US 7,844,778 B2
(45) Date of Patent: Nov. 30, 2010

(54) INTELLIGENT CACHE REPLACEMENT MECHANISM WITH VARYING AND ADAPTIVE TEMPORAL RESIDENCY REQUIREMENTS

(75) Inventors: Xiaowei Shen, Hopewell Junction, NY (US); Balaram Sinharoy, Poughkeepsie, NY (US); Robert W. Wisniewski, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 11/484,824

(22) Filed: Jul. 11, 2006

(65) Prior Publication Data
US 2010/0281218 A1  Nov. 4, 2010

(51) Int. Cl.
G06F 12/00 (2006.01)
G06F 13/00 (2006.01)
(52) U.S. Cl. .................. 711/133; 711/100; 711/128; 711/136; 711/154
(58) Field of Classification Search ............ 711/128, 711/133–4, 134, 136, 100, 118
See application file for complete search history.

(56) References Cited

U.S. PATENT DOCUMENTS

| | | | |
|---|---|---|---|
| 5,224,217 A * | 6/1993 | Zangenehpour | 711/136 |
| 6,349,365 B1 * | 2/2002 | McBride | 711/133 |
| 6,393,525 B1 | 5/2002 | Wilkerson et al. | |
| 6,542,966 B1 | 4/2003 | Crawford et al. | |
| 6,732,238 B1 * | 5/2004 | Evans et al. | 711/128 |
| 6,901,483 B2 * | 5/2005 | Robinson et al. | 711/133 |
| 7,437,513 B2 * | 10/2008 | Saida et al. | 711/128 |
| 2005/0188158 A1 * | 8/2005 | Schubert | 711/133 |

* cited by examiner

*Primary Examiner*—Tuan V. Thai
(74) *Attorney, Agent, or Firm*—Scully, Scott, Murphy & Presser, P.C.

(57) ABSTRACT

A method for replacing cached data is disclosed. The method in one aspect associates an importance value to each block of data in the cache. When a new entry needs to be stored in the cache, a cache block for replacing is selected based on the importance values associated with cache blocks. In another aspect, the importance values are set according to the hardware and/or software's knowledge of the memory access patterns. The method in one aspect may also include varying the importance value over time over different processing requirements.

22 Claims, 4 Drawing Sheets

INTELLIGENT CACHE REPLACEMENT MECHANISM WITH VARYING AND ADAPTIVE TEMPORAL RESIDENCY REQUIREMENTS

STATEMENT REGARDING FEDERALLY SPONSORED RESEARCH OR DEVELOPMENT

This invention was made with Government support under Contract No.:NBCH020056 (DARPA) awarded by Defense, Advanced Research Projects Agency. The Government has certain rights in this invention.

FIELD OF THE INVENTION

The present disclosure generally relates to computer processors and particularly to memory management.

BACKGROUND OF THE INVENTION

Cache memory is one of the critical elements in computer processors for achieving good performance on the processors. Generally, a cache is a smaller, faster memory used by a central processing unit of a computer to reduce the average time to access its data or instructions. The cache typically stores copies of the data from the most frequently used main memory locations. The fundamental idea of cache organization is that by keeping the most frequently accessed instructions and data in the fast cache memory, the average memory access time will approach the access time of the cache. A cache miss is costly because the data must then be fetched from a higher-level cache, main memory, or potentially another processor's cache on a multiprocessor, which incurs a delay because accessing the other memory is slower than accessing the cache memory. Thus, maximizing the cache's hit rate is one of the important factors in achieving good performance.

When a cache miss occurs, one of the existing entries needs to be replaced to make room for the new entry. Different replacement policies or rules exist for replacing the entries. One common algorithm used by the hardware is Least Recently Used (LRU), which replaces the least recently used entry, for instance. While LRU performs well in many cases, it may not be suitable for some situations. A streaming application is an example application where LRU cache replacement may not have the desired performance.

In addition, existing cache solutions typically apply a fixed algorithm across all applications and do not consider requirements that change from application to application or those applications that have requirements that change over time. A known technique allows a given line to be pinned in the cache, however, pinning does not capture the temporal nature of many cache lines. Another known method allows a user to specify the importance of certain cache lines, but there is no temporality associated with the indication. Other existing work looks at distinguishing between temporal and non-temporal data, however, does not consider varying indication values of cache lines over time.

Various requirements that change over time sometimes can be deduced in hardware from the memory access patterns. Also, software or the operating system can determine different access patterns among different applications or threads. In other cases the operating system can proactively know the behavior of a given application. What is needed is a cache replacement mechanism that allows the dynamic characteristics of reference patterns to be taken into consideration. Hardware alone may take advantage of this mechanism and improve performance for some applications. Additional benefit can be gained because software, such as a hypervisor or other, or the operating system can also determine the expected access pattern, or can proactively know the expected access patterns; what is needed is a mechanism that allows software to affect the cache replacement algorithm.

BRIEF SUMMARY OF THE INVENTION

A method for replacing data in cache memory and a cache memory organization are provided. The method in one aspect includes associating a value with an entry in cache memory. The value is for indicating the importance of keeping the entry in the cache memory. The method also includes setting the value according to an expected access pattern for the entry, wherein the value is used to determine an entry in the cache for replacement.

In another aspect, the method may also include selecting an entry in the cache with the lowest associated value for replacing. Yet in another aspect, the method may include selecting an entry in a cache set with the lowest associated value for replacing. Still yet, the method may further include selecting an entry in a cache set with the lowest associated value for replacing, and if there are a plurality of entries with the same lowest associated value, selecting an entry from the plurality of entries using a default replacement algorithm.

In a further aspect, the method may include resetting the value according to a varying expected access pattern for the entry. The setting may be performed by hardware, software or an operation system, or combination thereof. In one aspect, the software and/or the operating system are allowed to read the values from the cache memory control data.

In another aspect, the method may include maintaining the value assigned to the entry until the entry is replaced. In yet another aspect, the method may include decaying the value. Still in another aspect, the method may include decaying one or more values associated with an associative set of the cache memory when an entry from the associative set is selected for replacement. In another aspect, the method may include periodically decaying one or more values associated with one or more respective entries in the cache.

Further yet, the method may include decaying one or more values associated with one or more respective entries in an associative set of the cache memory on every predetermined cycle, on every predetermined number of accesses to the associative set, or on every predetermined number of accesses to an entry in the associative set or combination thereof. The method may further include decaying one or more values associated with one or more respective entries in the cache memory on every predetermined number of accesses to the cache memory.

In one aspect, the software may instruct the hardware to decay one or more values associated with one or more respective entries in the cache memory based on a predefined function. The method may in another aspect include automatically refreshing the value when the value decays to a predefined value. Still yet, the method may include decaying one or more values associated with one or more respective entries in the cache based on a second value indicating whether the one or more values are candidates for decay.

The cache memory in one aspect includes a plurality of cache memory locations and a plurality of bit value fields. Each of the plurality of bit value fields is associated with one of the plurality of cache memory locations. A bit value field is used to store a value representing the importance of keeping an entry contained in a respective cache memory location. The value in one aspect is set according to an expected access pattern for the entry in the respective cache memory location. In another aspect, the cache memory may include a plurality of second bit value fields associated with respective plurality of cache memory locations. The plurality of second bit fields is for storing values for indicating whether respective entries in the respective cache memory location should decay.

Further features as well as the structure and operation of various embodiments are described in detail below with reference to the accompanying drawings. In the drawings, like reference numbers indicate identical or functionally similar elements.

DETAILED DESCRIPTION

Figure 1:
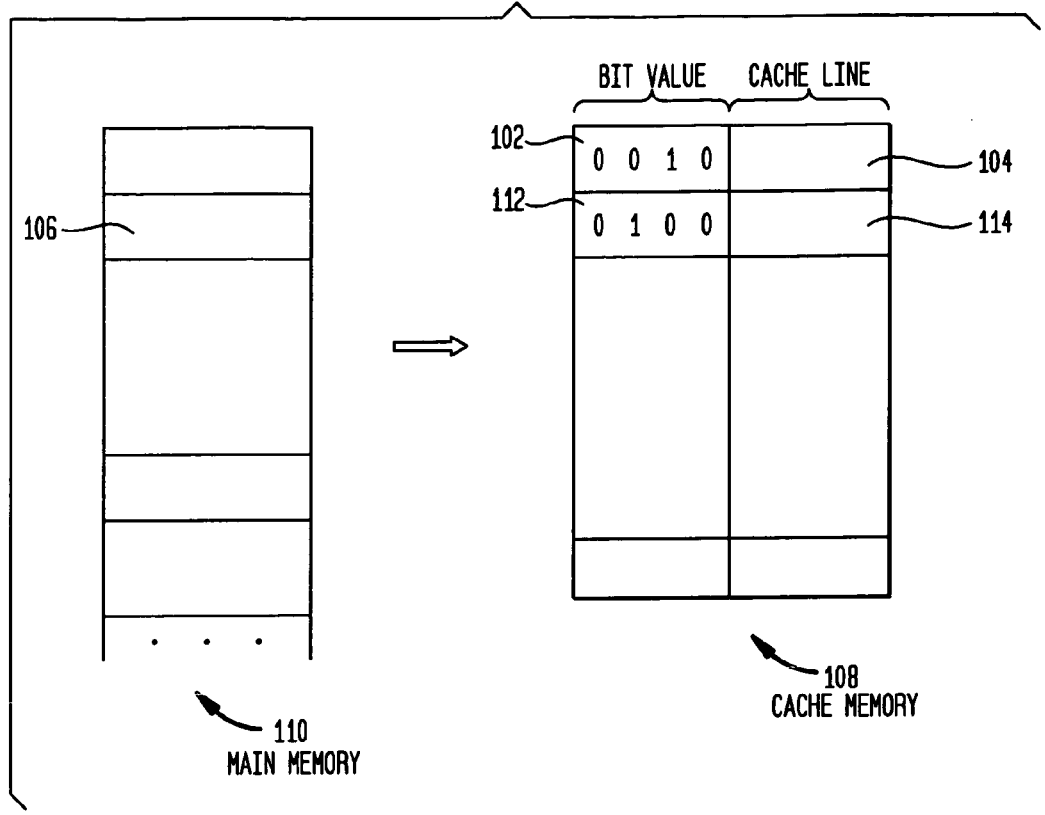
FIG. 1 is a block diagram illustrating a cache memory with associated bit values of the present disclosure in one embodiment.

FIG. 1 is a block diagram illustrating a cache memory with associated bit values of the present disclosure in an exemplary embodiment. Each location in a cache memory has a datum or a cache line 104. Briefly, a cache line is a unit of data that can be transferred between the main memory 110 and the cache 108. Cache line is also referred to as cache block. Different cache memories have different designs and range in size. For example, an address location 106 in the main memory 110 maps to a location in the cache memory containing the data from that main memory's location 110, which has been cached. There are several different types of mapping used in cache memory organization. Known mapping procedures include direct mapping, fully associative mapping, and set associative or n-way associative mapping. The cache is direct mapped if each entry in main memory can map to just one location in the cache. If any entry in the cache can have any entry in the main memory, the cache is fully associative. Set associative or also known as n-way associative refers to a case where an entry in the main memory can be cached in n cache locations. On a cache miss, an entry or a cache line in the cache is replaced using, for example, a replacement policy.

In one embodiment of the present disclosure, a set of bits 102 is associated with each cache line 104 in cache memory 108. In an exemplary embodiment, the set of bits 102 is used to indicate the importance of keeping the cache line in the cache. For instance, higher values may indicate greater importance of keeping the associated cache lines in the cache while lower values may indicate that the associated cache lines need not be kept in the cache. The format and size of the bit values is of design choice, which may depend on different memory and/or cache configurations for a particular system. The present disclosure does not limit the bit value format to any particular structure. In the example shown in FIG. 1, the bit values have four bits. The bit value 102 associated with a cache line 104 forms an importance value for that cache line. When a cache line needs to be replaced in an asscoiativety group such as for example 104 and 114, the bit values 102, 112 associated with the cache lines 104, 114 are compared and the cache line with the least importance value is replaced.

For instance, a CPU needing to access memory examines the cache 108 for the word it needs. If the word is found in the cache, it is read. If the word addressed by the CPU is not found in the cache, referred to as a cache miss, the main memory 110 is accessed to read the word. Typically, a block of words containing the one just accessed is then transferred from main memory 110 to cache memory 108. This way, some data is transferred to cache so that future references to memory find those words in the fast cache memory. When a line is transferred to the cache on a cache miss, the cache may have to evict one of the existing entries to make room for that new line. In an exemplary embodiment of the present disclosure, the cache line 104 in the cache memory 108 with a least importance bit value 102 is selected for replacing.

Figure 2:
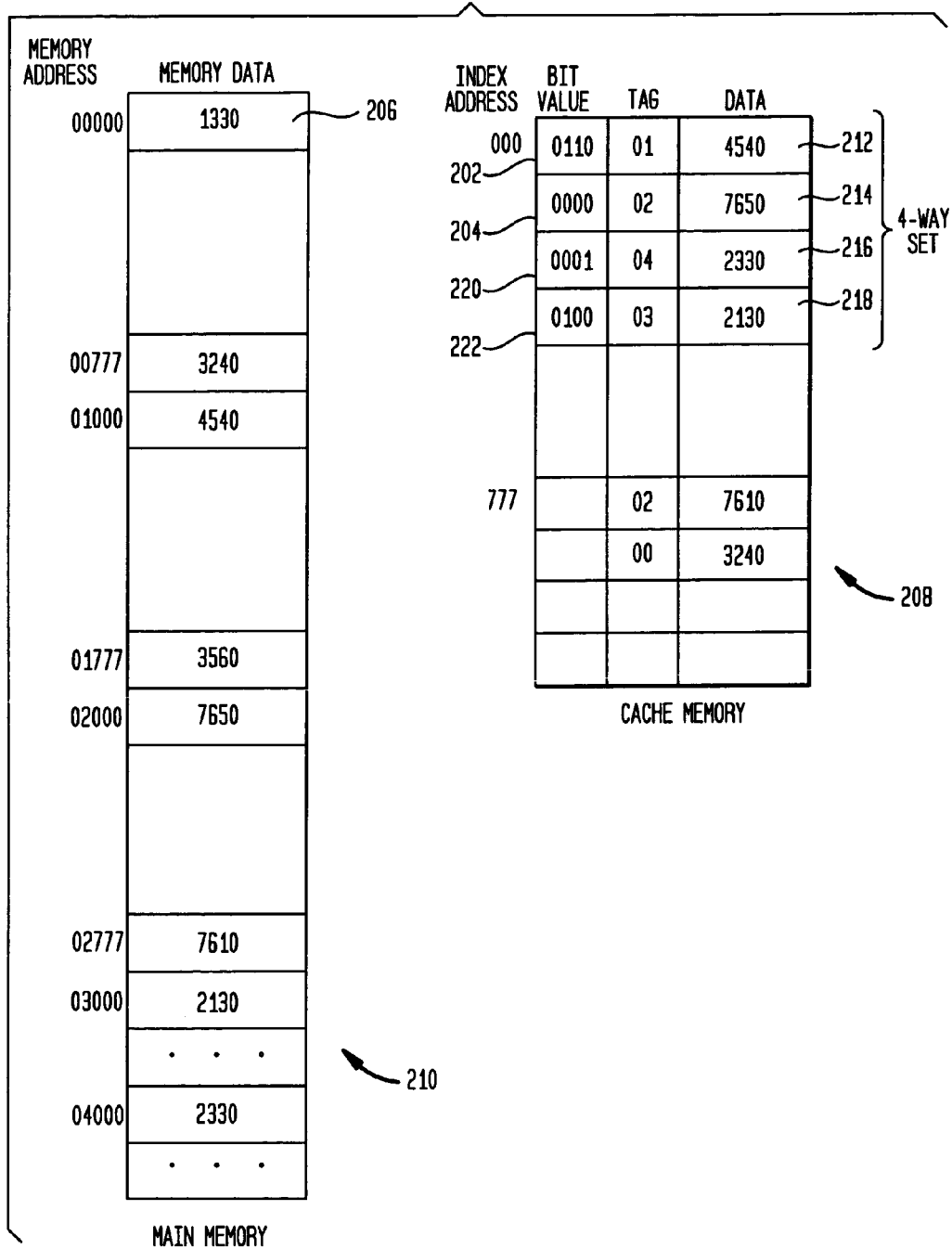
FIG. 2 illustrates an example of an n-way associative caching schema.

As another example, when a given cache line in an n-way associative set needs replacing, the cache line with the lowest importance value in the set may be chosen for replacement. FIG. 2 illustrates an example of an n-way associative caching schema. In n-way associative cache mapping, each location in main memory can be cached in any one of n cache locations. Each data word is stored together with its tag and the number of tag-word items in one word of cache is said to form a set. The example shown is 4-way associative. For example, a memory location 206 in main memory 210 can map to any of four locations 212, 214, 216, 218 in cache memory 208. In this example, if the data at the main memory location 206 needs to be cached or copied into the cache memory 208, the bit values at 202, 204, 222, 222 associated with locations 212, 214, 216, 218 are evaluated. These bit values represent the importance values of the cache lines contained in the cache locations 212, 214, 216, 218. The cache line having the lowest importance value of the four is then selected for replacing. In one embodiment, if there is more than one cache line that has the same bit values, that is, they have the same importance values, a selected algorithm or a default algorithm may be used to select a cache line to replace. For instance, a default algorithm such as LRU, first-in-first-out (FIFO), random replacement, or any other known or will be known algorithm may be set as a default replacement method for selecting between or among the cache lines with the same importance value.

In an exemplary embodiment of the present disclosure, the hardware, software, the operating system, or combination thereof may designate the importance of keeping the associated cache line in the cache by setting the bit values. Software may set the importance bit values according to its knowledge of the content of the cache lines and the priority of the threads or entities that are associated with those cache lines. For instance, software or the operating system, or the like may set the bit values for cache lines associated with operating system instructions, daemon processes, or high-priority applications or the like to a high value, for example, so that those cache lines are not replaced too frequently. Conversely, software or the operating system or the like may set low bit values for those cache lines associated with threads or applications that do not need to have the data in the cache for more than few accesses. Such threads or applications may include streaming applications such as MPEG, which, for example, may be accessed once. As another example, an operating system may know that certain address locations in the physical memory contain content that when cached should not be selected for replacing. In such cases, when that physical memory location is cached, the operating system can set the importance bit value to a higher value than the initial default value.

Figure 3:
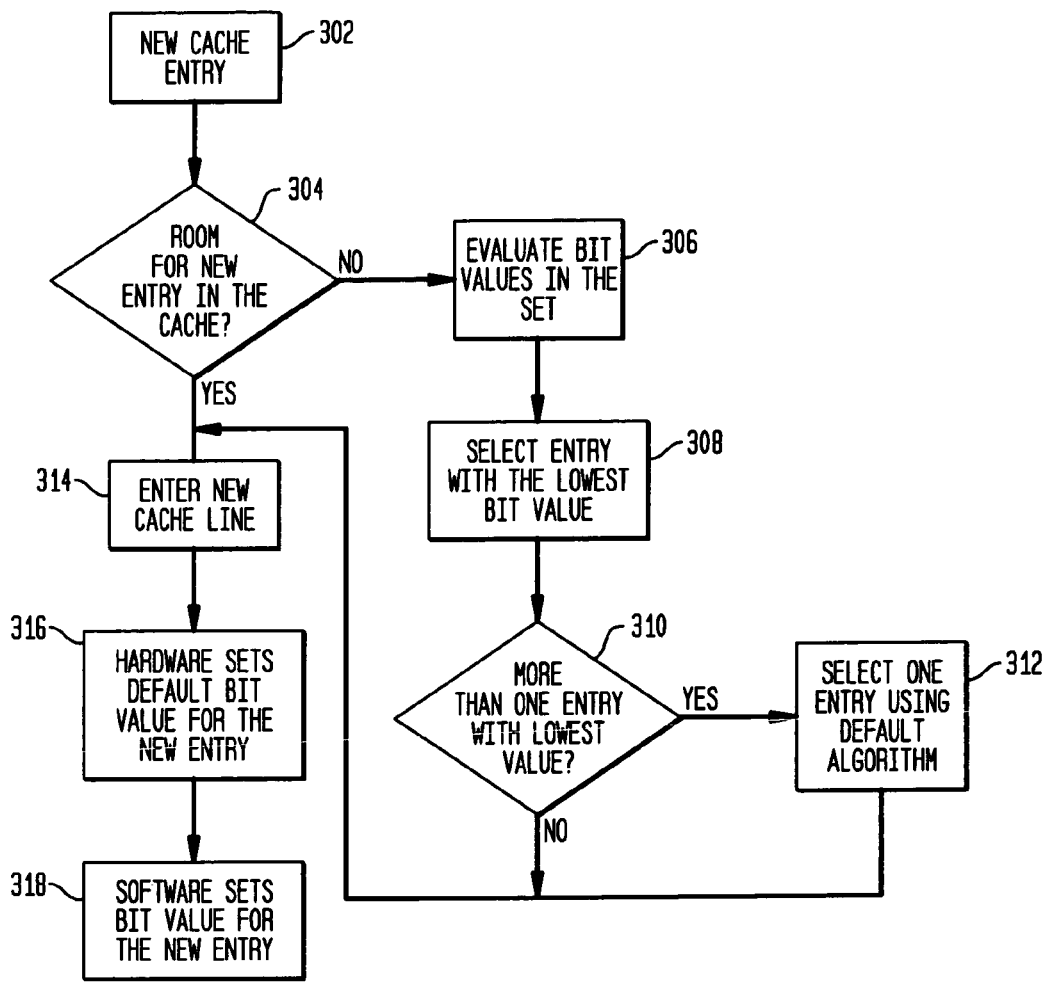
FIG. 3 is a flow diagram illustrating a method of the present disclosure in one embodiment.

FIG. 3 is a flow diagram illustrating a method of the present disclosure in one embodiment. At 302, a new cache line needs to be brought in to the cache memory. For instance, when the processor wishes to read or write a location in main memory, it first checks whether that memory location is in the cache. This is generally accomplished by comparing the address of the memory location to all tags in the cache that might contain that address. If the processor finds that the memory location is not in the cache (a cache miss), the processor accesses the main memory's (or any other intermediary memory's including another processor's cache) location to retrieve the desired data. Typically that data is entered in the cache. Continuing with FIG. 3, at 304, a test is made to determine whether there is room in the cache set for the new cache line entry. It was explained that a set in a set associative cache refers to cache locations that can store cache lines having the same index but different tags. If the size of the set equals the size of the entire cache, the mapping is fully associative. At 304, if it is determined that there is no room for the new cache line entry, an existing entry needs to be evicted. Therefore, at 306, in order to determine which entry should be evicted to make room for the new entry, the bit values assigned to each cache line in the set are examined. At 308, the cache line with the lowest bit value is selected for replacement. In the case where there is more than one entry with the same low bit values, a default replacement algorithm may be used to choose one entry from the number of entries having the same bit value. Thus, at 310, it is determined whether there is more than one entry with the same lowest bit value. At 312, if more than one entry exists with the same lowest bit value, a default algorithm is used to select an entry. Examples of such default algorithms may include but is not limited to LRU, FIFO, random replacement, or any other known or will be known algorithms.

At 314, once there is a room in the set for the new entry, for example, because an existing entry was evicted as described above, or there was an empty entry, the new cache line is entered into the cache memory. At 316, hardware may associate a default bit value for the newly entered cache line representing the importance of keeping this new cache line in the cache. Additionally or alternatively, at 318, software such as the operating system or any other software that knows about the priority of running threads or applications may set the associated bit values. In one embodiment, a default bit value for setting the initial importance values for new cache line entries may be a non-zero value. This way, the hardware or the software having knowledge of importance or lack thereof of different cache lines can reset bit values relative to the default non-zero value. For instance, a default value of 4 (0100 binary) may be used for incoming cache lines initially. The software or the hardware may reset the values of the cache lines. For example, for those lines with lower importance (for instance, the software determines that a particular cache line need not stay in the cache), the bit values would be set to less than 4. Conversely, for the lines with higher importance, the bit values would be set to greater than 4.

In one embodiment of the present disclosure, the bit values can be set to decay. Alternatively, they may remain constant. Yet in another embodiment, some values may be set to decay while others remain constant. For example, each time a cache line in a set is picked for replacing, the bit values associated with the rest of the cache lines in the set may be decremented, for example, by one. Referring to FIG. 2 as an example, if the cache line at 214 is selected for replacing, the bit values in the entire set may be decremented, in this example, three bit values 202, 220, 222 corresponding to the cache lines 212, 216, 218 in this 4-way associative set to bit values of 5 (0101), 0 (0000), and 3 (0011), respectively.

Figure 4:
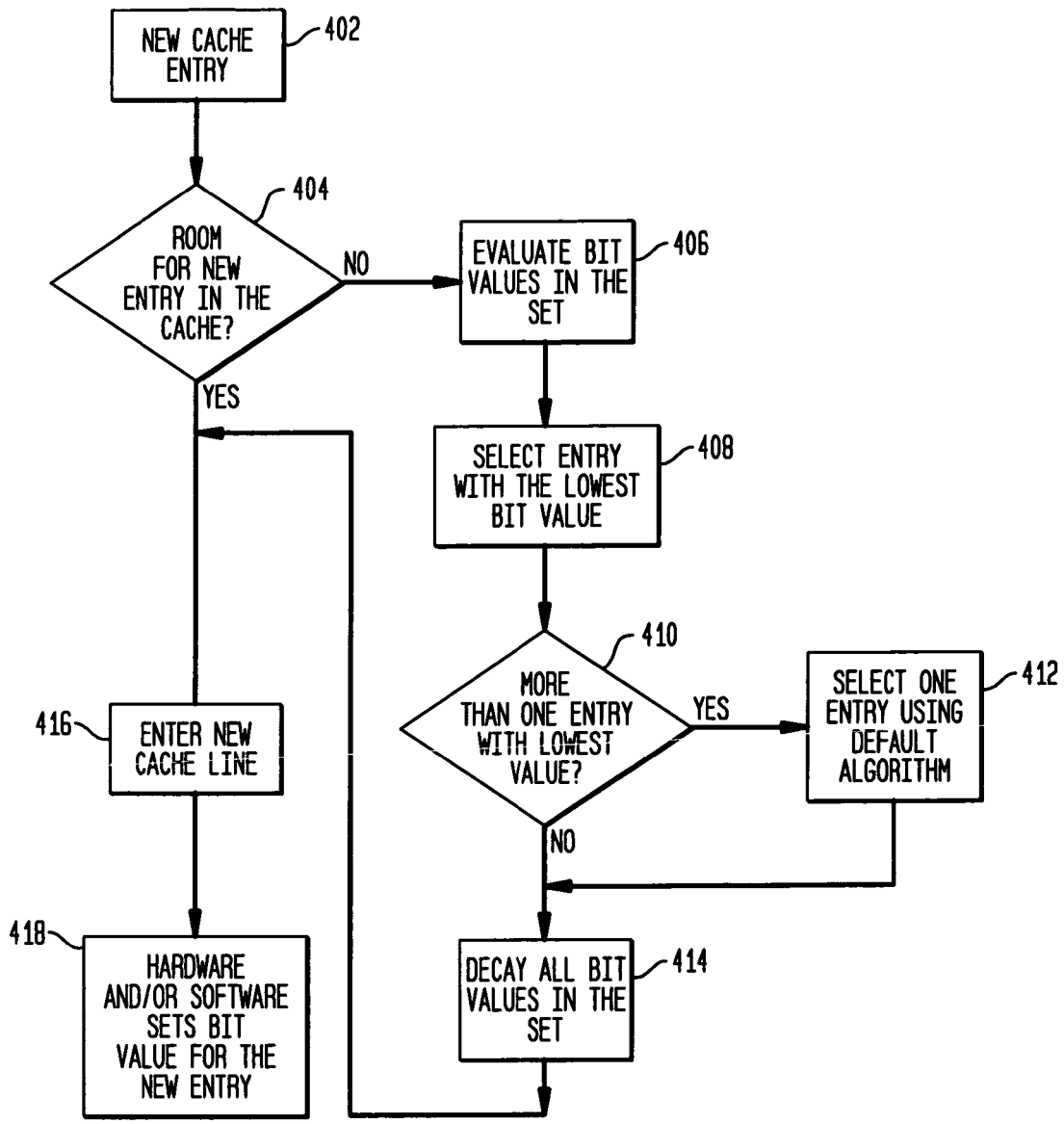
FIG. 4 is a flow diagram illustrating a method of decaying the importance bit values associated with the cache lines in one embodiment.

FIG. 4 is a flow diagram illustrating a method of decaying the importance bit values associated with the cache lines in one embodiment. As described in FIG. 3, when new data needs to be cached at 402, a processor checks at 404 to determine whether there is room for the new entry. If an existing entry has to be swapped out to make room for the new cache line, the importance bits associated with each cache line in the set are evaluated at 406 and the entry having the lowest importance bit is selected at 408. At 410, if there is more than one entry in the set with the same lowest importance bit values, a default algorithm may be used to select the one to be replaced at 412. At 414, the importance bit values for all cache lines in the same set are decayed. For instance, the bit values may be decremented by a predetermined value such as one. At 416, the new cache line is entered and at 418 the hardware and/or software may set initial bit values for the new entry.

In one embodiment of the present disclosure, the bit values may be initially set to a non-zero value, for example, so that other components, which can access and update the bit values can specify a value of less importance. For instance, a standard cache line may have a non-zero value from which other cache lines may be graded based on the standard cache line.

In one embodiment, the bit values or the importance values of cache lines may be set to be automatically refreshed by, for example, hardware, when the values degrade to a predefined value. This would maintain an overall high value for cache lines but also allow for the possibility of those cache lines being evicted as the value degrades but before the value is refreshed.

Yet in another embodiment, the hardware may degrade the importance bit values for each cache line in the set. This degrading or decaying may be performed periodically, for instance, every n number of cycles such as every 1000 cycle, every n number of memory accesses to the cache line in the set, every n number of memory accesses to the cache set, every n accesses to the cache memory, every n snoops to the cache lines by other processes, etc., and the like. The hardware may degrade or decay the importance bit values, for instance, by decrementing the value by one.

In one embodiment, the software may provide instructions to the hardware, for instance, using a register, as to which decaying functions to use, for example, from a set of predefined decaying functions or by explicitly instructing to use a specific decaying function. Examples of other decaying functions may include but are not limited to, read-once, write-once, access-once, that is, if the cache line was read once, written once and accessed once, that cache line may be degraded; read n times, write n times, access n times, that is after n times of read, write and access, that cache line may be degraded; a step function such as data needed throughout the execution of the next 1000 instructions or cycles but not need after that; a step function with a condition such as data is needed if another data is resident or data is not needed if another data is replaced.

Still yet in another embodiment, the software can examine the importance bit values for the cache lines and refresh the values, for instance, according to its knowledge of the cache lines. Take for example a case in which the hardware is set up so that cache lines having importance bit values of less than a predefined value would be swapped out. For instance, cache lines with less than the value of 4 as their associated bit or importance values are candidates for replacement. The software knowing this may reset the values, for instance, to a higher value than the predefined value for those cache lines that should not be evicted, or to a lower value that the predefined value for those cache lines that the software knows should be swapped out.

Further yet in another embodiment, bit values associated with selected cache lines can be set so that they will not be degraded or decayed. For instance, a bit in the set of bit values may be reserved to indicate whether or not that set of bit values should be a candidate for decaying. Referring to FIG. 1, one bit in the 4 bits, for example, the left most bit may be used as an indication bit as to whether or not the bit values should be decayed. The three right most bits can then be used to indicate the importance value. For instance, the binary bit value of 0110 would indicate that this cache line having importance value of 6 (110) should not be decayed as indicated by the first 0 in 0110. Conversely, value 1 in that bit position (1110) would indicate that the importance value of 6 should be decayed.

In another embodiment, the importance bit value may be set or reset based on cache line granularity, page granularity, memory region granularity, etc., or the like. The value may be also set according to congruence class of cache lines, which for example, can be specified by software via memory access coloring.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for replacing an entry in cache memory, comprising:
associating a value with an entry in cache memory, the value for indicating importance of keeping the entry in the cache memory; and
setting the value in the cache memory according to at least one or more of, whether a thread accessing the entry in the cache memory is associated with operating system instructions, daemon process, high-priority applications, or streaming applications, content of the entry in the cache memory, system priority of a running thread, number of accesses a thread needs into the entry in the cache memory, or content contained in an address location in physical memory to be cached into the entry in the cache memory, or combinations thereof,
wherein the value is used to determine an entry in the cache for replacement.

2. The method of claim 1, further including:
selecting an entry in the cache with the lowest associated value for replacing.

3. The method of claim 1, further including:
selecting an entry in a cache set with the lowest associated value for replacing.

4. The method of claim 1, further including:
selecting an entry in a cache set with the lowest associated value for replacing, and if there are a plurality of entries with the same lowest associated value, selecting an entry from the plurality of entries using a default replacement algorithm.

5. The method of claim 1, further including:
resetting the value in the cache memory according to a varying expected access pattern for the entry.

6. The method of claim 1, wherein the setting includes at least one of hardware, software, and operating system setting the value according to an expected access pattern for the entry.

7. The method of claim 1, further including:
allowing at least one of an operating system and software to read the value.

8. The method of claim 1, further including:
maintaining a value assigned to the entry until the entry is replaced.

9. The method of claim 1, further including:
decaying the value assigned to the entry.

10. The method of claim 1, further including:
decaying one or more values associated with one or more respective entries in an associative set of the cache memory when an entry from the associative set is selected for replacement.

11. The method of claim 1, further including:
periodically decaying one or more values associated with one or more respective entries in the cache.

12. The method of claim 1, further including:
decaying one or more values associated with one or more respective entries in an associative set of the cache memory on every predetermined cycle.

13. The method of claim 1, further including:
decaying one or more values associated with one or more respective entries in an associative set of the cache memory on every predetermined number of accesses to the associative set.

14. The method of claim 1, further including:
decaying one or more values associated with one or more respective entries in an associative set of the cache memory on every predetermined number of accesses to an entry in the associative set.

15. The method of claim 1, further including:
decaying one or more values associated with one or more respective entries in the cache memory on every predetermined number of accesses to the cache memory.

16. The method of claim 1, further including:
software instructing hardware to decay one or more values associated with one or more respective entries in the cache memory based on a predefined function.

17. The method of claim 16, wherein the predefined function includes one or more or combination of read-once, write-once, access-once; read n-times, write n-times, access n-times; a step function; a step function with condition; and a step function with correlation condition.

18. The method of claim 1, further including:
setting the value initially to a non-zero value.

19. The method of claim 1, further including:
automatically refreshing the value when the value decays to a predefined value.

20. The method of claim 1, further including:
decaying one or more values associated with one or more respective entries in the cache based on a second value indicating whether the one or more values are candidates for decay.

21. A cache memory, comprising:
a plurality of cache memory locations; and
a plurality of bit value fields, each of the plurality of bit value fields associated with one of the plurality of cache memory locations, wherein a bit value field is used to store a value representing importance of keeping an entry contained in a respective cache memory location, the value being set according to at least one or more of, whether a thread accessing the entry the cache memory is associated with operating system instructions daemon process, high-priority applications, or streaming applications, content of the entry in the cache memory, system priority of a running thread, number of accesses a thread needs into the entry in the cache memory, or content contained in an address location in physical memory to be cached into the entry in the cache memory, or combinations thereof.

22. The cache memory of claim 21, further including:
a plurality of second bit value fields associated with respective plurality of cache memory locations, the plurality of second bit fields for storing values for indicating whether respective entries in the respective cache memory location should decay.

* * * * *